(12) United States Patent
Alahyari

(10) Patent No.: US 12,428,166 B2
(45) Date of Patent: Sep. 30, 2025

(54) COOLING ARCHITECTURE USING CRYOGENIC FUELS

(71) Applicant: Hamilton Sundstrand Corporation, Charlotte, NC (US)

(72) Inventor: Abbas A. Alahyari, Glastonbury, CT (US)

(73) Assignee: HAMILTON SUNDSTRAND CORPORATION, Charoltte, NC (US)

( * ) Notice: Subject to any disclaimer, the term of this patent is extended or adjusted under 35 U.S.C. 154(b) by 209 days.

(21) Appl. No.: 18/146,001

(22) Filed: Dec. 23, 2022

(65) Prior Publication Data
US 2024/0208661 A1    Jun. 27, 2024

(51) Int. Cl.
*F02C 3/32* (2006.01)
*B64D 27/24* (2006.01)
*B64D 33/08* (2006.01)
*B64D 41/00* (2006.01)
*H02K 55/00* (2006.01)

(52) U.S. Cl.
CPC ............ *B64D 33/08* (2013.01); *B64D 27/24* (2013.01); *B64D 41/00* (2013.01); *F02C 3/32* (2013.01); *H02K 55/00* (2013.01)

(58) Field of Classification Search
CPC .. F02C 7/224; F02C 7/14; F02C 7/236; F02C 3/32; B64D 37/34
See application file for complete search history.

(56) References Cited

U.S. PATENT DOCUMENTS

| | | | | |
|---|---|---|---|---|
| 2,704,438 | A | * | 3/1955 | Sheets ...................... F02K 9/44 60/39.5 |
| 5,275,000 | A | * | 1/1994 | Coffinberry ............... F02C 3/28 60/734 |
| 6,438,969 | B1 | | 8/2002 | Laskaris et al. |
| 6,442,949 | B1 | | 9/2002 | Laskaris et al. |
| 6,553,773 | B2 | | 4/2003 | Laskaris |
| 9,261,295 | B1 | | 2/2016 | Schmidt et al. |
| 11,041,439 | B2 | | 6/2021 | Roberge |

(Continued)

FOREIGN PATENT DOCUMENTS

EP    3904218 A1    11/2021
FR    3110895 B1    6/2022

(Continued)

OTHER PUBLICATIONS

Abstract for FR3110895 (B1), Published: Jun. 24, 2022, 1 page.

(Continued)

*Primary Examiner* — Thuyhang N Nguyen
(74) *Attorney, Agent, or Firm* — CANTOR COLBURN LLP

(57) ABSTRACT

A system for cooling a superconducting motor includes a combustor and fuel tank that contains a fuel. The system further includes a cooling system that provides the fuel to the superconducting motor or a cryocooler to cool the superconducting motor, resulting in at least partially vaporized fuel coming out of the superconducting motor or cryocooler. The cooling system also a cryocooler and a two-phase ejector that mixes the fuel from the tank and the at least partially vaporized fuel to produce a mixed fuel. The combustor receives the mixed fuel and generates electric power due its combustion. The power can be provided to the superconducting motor.

10 Claims, 3 Drawing Sheets

(56) References Cited

U.S. PATENT DOCUMENTS

| | | | | |
|---|---|---|---|---|
| 2013/0186097 | A1* | 7/2013 | Hains | F02C 7/224 |
| | | | | 60/39.182 |
| 2017/0159569 | A1* | 6/2017 | Miller | F02C 7/06 |
| 2020/0047908 | A1* | 2/2020 | Filipenko | B64D 37/30 |
| 2020/0141322 | A1* | 5/2020 | Shafique | B64D 37/10 |
| 2021/0381429 | A1 | 12/2021 | Taylor | |
| 2023/0339621 | A1* | 10/2023 | Sarkar | F02C 3/22 |

FOREIGN PATENT DOCUMENTS

| | | | |
|---|---|---|---|
| GB | 2587556 | A | 3/2021 |
| KR | 20150061276 | A | 6/2015 |
| WO | 2007001432 | A2 | 1/2007 |

OTHER PUBLICATIONS

Abstract of KR20150061276 (A): Published: Jun. 4, 2015, 1 page.
European Search Report for Application No. 23204968.4, mailed Apr. 30, 2024, 8 pages.

* cited by examiner

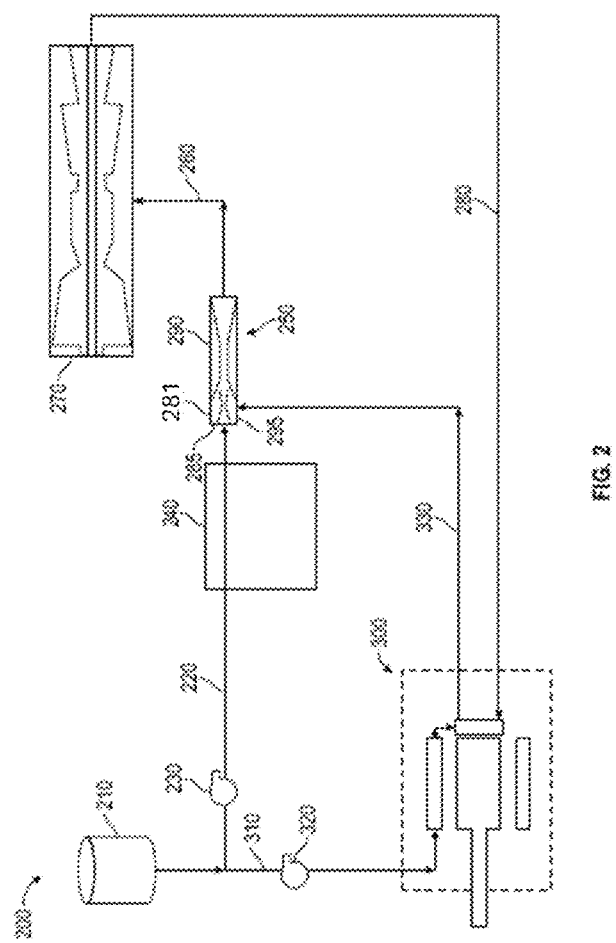

COOLING ARCHITECTURE USING CRYOGENIC FUELS

STATEMENT OF FEDERAL SUPPORT

This invention was made with Government support under Government Contract No. DE-AR0001404 awarded by the Department of Energy. The Government has certain rights in the invention.

TECHNICAL FIELD

This disclosure relates to cooling electric motors and, more particularly, to a cooling architecture that can use fuel to cool superconducting motors.

BACKGROUND

As air travel seeks more sustainable approaches, there has been significant research done on operating aircraft more efficient and, possibly, with sustainable fuels. Further, as aircraft become more electric, the need to improve the operations/efficiency of electric motors has become a source of investigation.

One approach has been to utilize high efficiency electric motors. An example of motors that may be used are so-called super conducting motors. Such motors include superconducting materials used for the windings therein and can enable high-efficiency and high-power-density aviation class electric motors and drives. However, motors that include superconducting materials need to be cryogenically cooled to temperatures of about 77° K. or less to function properly. For example, to minimize AC losses, superconducting materials such as $MgB_2$ need to be cooled to temperatures in the range of 20° K.

A number of approaches are available including cooling architectures including thermal contact to liquefied gases, and cryogenic refrigerators, usually termed cryocoolers.

BRIEF SUMMARY

Disclosed are one embodiments of systems and method to cool a superconducting motor.

In one embodiment, disclosed is a system for cooling a superconducting motor The system includes: fuel tank that contains a fuel; a combustor that receives the fuel from the fuel tank and generates electric power due to combustion of the fuel and provides the electric power to the superconducting motor; and a cooling system that provides the fuel to the superconducting motor to cool the superconducting motor. The cooling system includes a two-phase ejector that includes a liquid fuel input, a partially or totally vaporized fuel input and an output, a main path that transports fuel from the fuel tank, through the two-phase ejector and to the combustor, wherein the liquid fuel input is fluidly coupled to and receives the liquid fuel from the fuel tank via the main path; and a cooling path that that transports fuel from the fuel tank, through the superconducting motor and to the partially or totally vaporized fuel input of the two-phase ejector. The two-phase ejector mixes the fuel and the at least partially vaporized fuel together to form a fuel stream at the output.

The fuel in this embodiment or any other embodiment disclosed herein can be $LH_2$.

In this embodiment or any other embodiment disclosed herein: the main path includes a first path that transports the liquid fuel from the tank to liquid fuel input; the cooling path includes second path that carries liquid fuel from the tank to the superconducting motor; the cooling path includes a third path that that transports at least partially vaporized fuel away from the superconducting motor to the partially or totally vaporized fuel input; and the main path includes a fourth path that carriers mixed fuel from the output of the two-phase ejector to the combustor.

In this embodiment or any other embodiment disclosed herein, a first pump arranged along the first path that increases the pressure of the fuel before it is provided to the two-phase ejector.

In this embodiment or any other embodiment disclosed herein the second path contains a second pump, that increases the pressure of the fuel before it is provided to the superconducting motor.

In this embodiment or any other embodiment disclosed herein. the first path passes through other aircraft loads before it provides fuel to the two-phase ejector.

Also disclosed herein is an embodiment that includes a cryocooler. The cryocooler embodiment is a system for cooling a superconducting motor that includes: a fuel tank that contains a fuel; a combustor that receives the fuel from the fuel tank and generates electrical power due to combustion of the fuel and provides the electric power to the superconducting motor; and a cooling system. In this embodiment, the cooling system includes: a cryocooler to cool the superconducting motor, wherein the cryocooler is arranged to define a cryocooling loop that passes a working fluid through the superconducting motor; a two-phase ejector that includes a liquid fuel input, a partially or totally vaporized fuel input and an output; a main path that transports fuel from the fuel tank, through the two-phase ejector and to the combustor, wherein the liquid fuel input is fluidly coupled to and receives the liquid fuel from the fuel tank via the main path; and a cooling path that that transports fuel from the fuel tank, through the cryocooler and to the partially or totally vaporized fuel input the of the two-phase ejector, wherein the cooling path is arranged such that heat from the working fluid is transferred from the working fluid to the fuel to create at least partially or totally vaporized fuel. The two-phase ejector mixes the fuel and the at least partially vaporized fuel together to form a fuel stream at the output.

In the cryocooler embodiment, fuel can be Bio-LNG.

In the cryocooler embodiment, the main path includes a first path that transports the liquid fuel from the tank to liquid fuel input; the cooling path includes second path that carries liquid fuel from the tank to the cryocooler; the cooling path includes a third path that that transports at least partially vaporized fuel away from the cryocooler to the partially or totally vaporized fuel input; and the main path includes a fourth path that carriers mixed fuel from the output of the two-phase ejector to the combustor.

In the cryocooler embodiment, a first pump can be arranged along the first path that increases the pressure of the fuel before it is provided to the two-phase ejector.

In the cryocooler embodiment, the second path can contain a second pump, that increases the pressure of the fuel before it is provided to the cryocooler.

In the cryocooler embodiment, the first path can pass through other aircraft loads before it provides fuel to the two-phase ejector.

In the cryocooler embodiment, the working fluid is chosen from the group consisting of helium, hydrogen, or a mixture of helium and hydrogen.

In the cryocooler embodiment, the second path can contain a third pump, that is used to move the fuel.

In the cryocooler embodiment, the cryocooler can be a sterling cryocooler, a magnetocaloric cryocooler, pulse tube cryocooler, a helium cryocooler, or a polycold cryocooler.

Also disclosed is a method for cooling a superconducting motor. The method includes: passing fuel from a fuel tank to combustor to generates electric power due to combustion of the fuel; and providing the electric power to the superconducting motor. Passing fuel includes: providing liquid fuel to a fuel a two-phase ejector that includes a liquid fuel input, a partially or totally vaporized fuel input and an output, wherein the liquid fuel is provided to the liquid fuel input via a main path; and providing liquid fuel to a cooling path that that transports fuel from the fuel tank, through the superconducting motor or a cryocooler and to the partially or totally vaporized fuel input of the two-phase ejector, wherein the fuel is partially or totally vaporized by the superconducting motor or the cryocooler. The two-phase ejector mixes the fuel and the at least partially vaporized fuel together to form a fuel stream at the output.

The method can be performed on any system disclosed herein or variations thereof.

BRIEF DESCRIPTION OF THE DRAWINGS

The following descriptions should not be considered limiting in any way. With reference to the accompanying drawings, like elements are numbered alike:

FIG. 2 is a schematic illustration of the cooling architectures for LH2 fuel.

DETAILED DESCRIPTION

A detailed description of one or more embodiments of the disclosed apparatus and method are presented herein by way of exemplification and not limitation with reference to the Figures.

Using superconducting materials (and in particular in the windings) in motors/drives of an aircraft allow for high-efficiency and high-power-density aviation class electric motors. However, to function properly, the superconducting materials in these motors/drives need to be cryogenically cooled. Disclosed herein is a system that synergistically uses cryogenic fuel sources that are combusted (to generate either or both thrust and electrical power) to cool superconducting materials in the motors.

In particular, detailed herein is a cooling system for a superconducting motor. As used herein, a superconducting motor is an electric motor that includes a at least one element formed of superconducting material. In one embodiment, the element is one or more windings of the electric motor.

The system includes a fuel tank containing a fuel in liquid form. The fuel can be $LH_2$ or Bio-LNG. These fuels are typically kept cold (e.g., cryogenic) temperatures. As more fully described below, the fuels can be used by a combustor in the aircraft and can provide reduced or no emissions. The combustor, that receives the fuel and generates rotational energy (or thrust, or both) through combustion of the fuel. The rotational energy can be used to generate electricity (either by the combustor itself or with a generator) that is then used to drive the superconducting motor.

As the fuel is cold it can also be used to keep the superconducting element of the motor cooled. Thus, in addition to the fuel tank, the system can include a cooling system or loop that routes the cold fuel through the superconducting motor and, in particular, coils of the superconducting motor to keep them cool. To that end, the cooling system comprises a fuel path that moves the liquid fuel from the tank through the superconducting motor. As the fuel passes through the motor, it absorbs heat and this can result in the fuel being partially or wholly vaporized. In another embodiment, the fuel is used to carry heat away from cryocooler that is used to cool the motor.

To reclaim the at least partially vaporized fuel, a two-phase ejector is provided. The two phase ejector is provided in the path between the fuel source/tank and the combustor. Via the ejector, the liquid fuel from the tanks serves entrain the vapor so that it can be provided to the combustor. This can result in vapor being converted partially or wholly back into a liquid form in some instances.

Figure 1A:
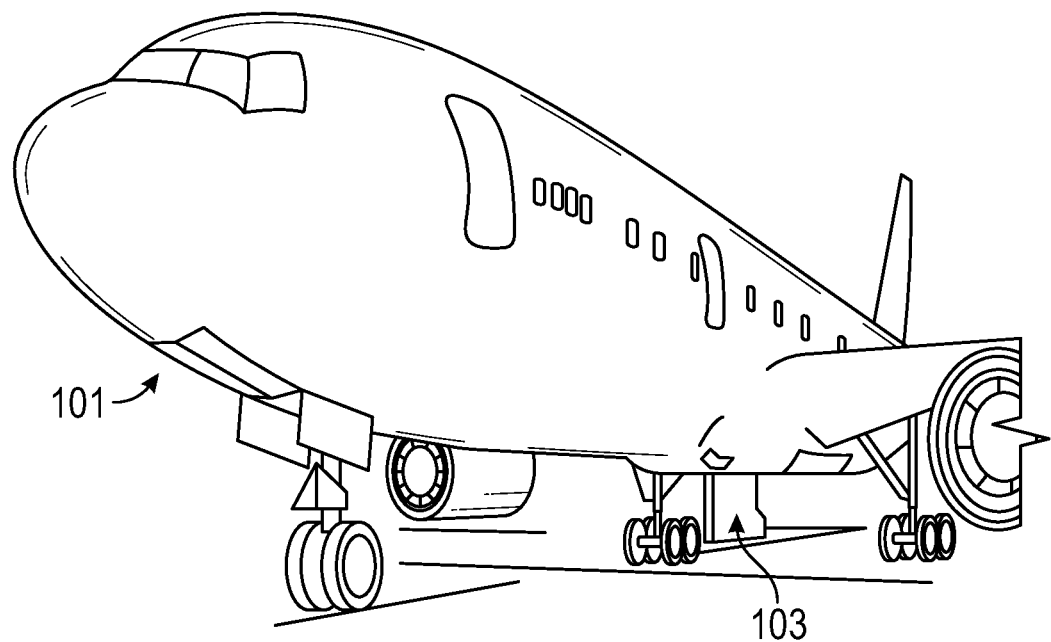
FIG. 1A is a schematic illustration of an aircraft.
Figure 1B:
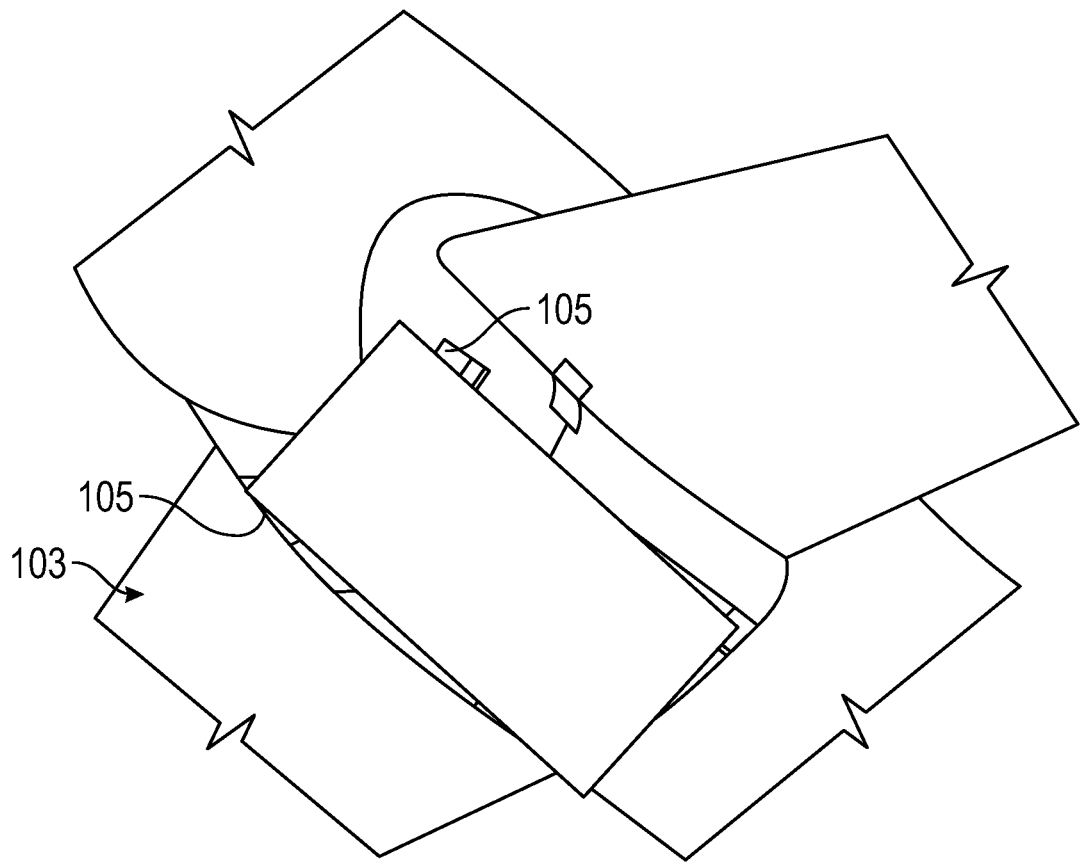
FIG. 1B is a schematic illustration of the belly of an aircraft.

In short, the two-phase ejector serves to mix the vaporized and liquid fuel to form an output fuel which is provided to the combustor. It should be noted that the fuel not need be provided directly to a motor and, rather, can be provided as a cooling (heat removal) source for a cryocooler. In such a case, the fuel is vaporized in the cryocooler and then mixed with the liquid as described above FIG. 1A and FIG. 1B are schematic illustrations of a conventional aircraft 101. As illustrated, the aircraft 101 includes an underside 103. The underside 103 can include the cooling system 105. However, the cooling system 105 could be located in other parts of the aircraft. The cooling systems herein can provide cooling for a superconducting motor in the range of 20 Kelvins (e.g., at 20 K).

Regardless of the fuel option, it is most efficient to boil the fuel at a low pressure to provide cooling abilities. As a result of this process, the resulting coolant has high heat transfer coefficients and no temperature rise.

In an embodiment, the liquid fuel can be can be a hydrogen fuel in a liquid for (e.g., $LH_2$). Such a fuel is typically stored at or about 20 K and, thus, can be applied directly to the superconducting motor.

With reference to FIG. 2 an example cooling system 200 is shown. The system 200 can be the located as shown by system 105 in FIG. 1 but that is not required.

The system 200 can include a fuel tank 210 that includes, for example, $LH_2$. The $LH_2$ fuel in the fuel tank 210 is at a temperature of 20 K and a pressure of 1 bar in one embodiment. The fuel is moved from the $LH_2$ fuel tank 210 to a combustor 270 through various paths. The "main" fuel path is from the tank 210 to the combustor 270 through ejector 250 and then into the combustor 270. As detailed below, this main fuel path can include first and fourth fuel paths 220 and 260.

The system 200 also includes a cooling path that provides fuel from the tank 210 through a superconducting electric motor 300. The system 200 can be either attached to or include the superconducting electric motor 300. The cooling path is shown as including the second fuel path 310 which branches from the main fuel path and provides liquid fuel to the superconducting electric motor 300. The fuel is then partially or completely vaporized as is passes superconducting electric motor 300. The partially or completely vaporized fuel is then provided via a third fuel path 320 back into the main fuel path. In particular, the third fuel path 320 provides the to a gas/vapor input 295 of the ejector 250. The partially or completely vaporized fuel is then mixed with the liquid fuel in the ejector 250 and mixed fuel is provided to combustor 270 via the fourth fuel path 260.

Additional optional elements are shown in the system 200 that can be used to control certain pressures/temperatures in the system so that it may operate more efficiently. These additional elements are not necessarily required.

In particular, the first path 220 may include the first pump 230, which moves the liquid fuel through the first path 220 by increasing the pressure of the liquid fuel. The first path 220 may include additional aircraft loads 240, which may be cooled through the flow of the liquid fuel.

To cool the motor 300, as noted above, the fuel further passes from the $LH_2$ tank 210 through the second fuel path 310. The second path 310 may optionally contain a second pump 320, which is used to increase the pressure of the fuel. The fuel moves through the superconducting motor 300, cooling the superconducting motor 300 and vaporizing the fuel. The vaporized fuel then exits the superconducting motor 300 through the third path 330, which transports the fuel to gas/vapor input 295 of the first two-phase ejector 250.

Once in the first two-phase ejector 250 the vaporized and liquid fuel are mixed, resulting in a liquid fuel at a pressure appropriate for the combustor 270. The fuel must be compressed to a compatible pressure in order to be used by the combustor. An appropriate pressure may be between 500 to 1000 psia. The first two-phase ejector 250 is used to raise the pressure of the vaporized fuel to that of the combustor.

The liquid fuel that flows through the first path 220 is pressurized to a pressure higher than that required by the combustor 270, and acts as the primary flow to the two-phase ejector 250 and enters at liquid inlet 285 of the ejector 250. The flow of liquid fuel that flows through the first path 220 is accelerated through a converging-diverging nozzle to supersonic velocities and entrains the low-pressure vapor stream received via third path 330. The combined flows of liquid fuel through the first path 220 and vaporized fuel through third path 330 mix in a mixing section 281 followed by a converging diverging diffuser 290, which further recovers the appropriate pressure.

The pressurized fuel is then transported from the two-phase ejector 250 to the first combustor 270 through the fourth path 260. The resulting fuel is received by the combustor 270, which generates rotational energy through the combustion of the liquid fuel, ultimately providing electricity to the superconducting motor 300 as indicated by connection 280. The combustor 270 could be part of an engine and could also generate thrust.

Figure 3:
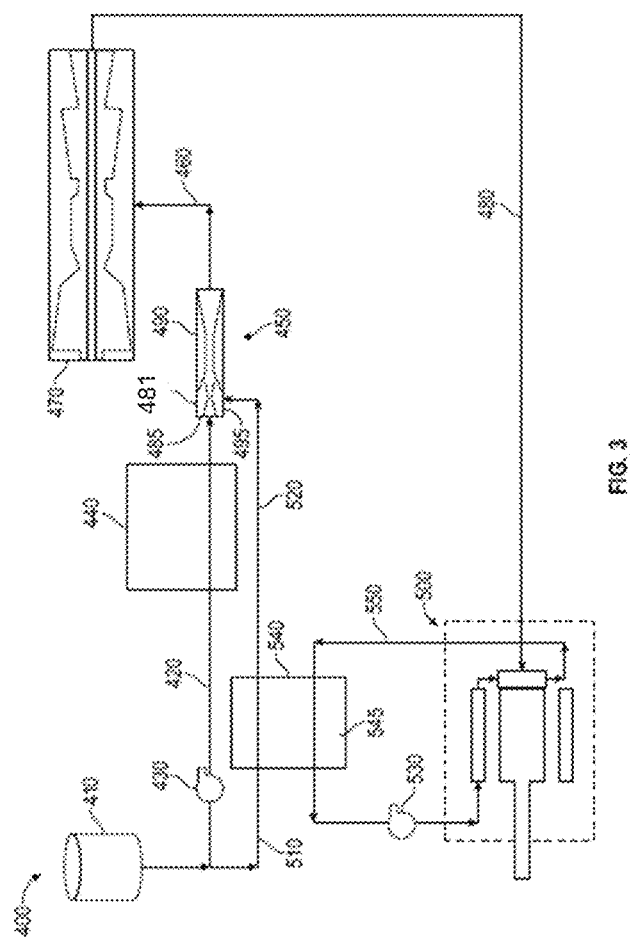
FIG. 3 is a schematic illustration of the cooling architectures for Bio-LNG fuel.

In an embodiment, a bio-liquid natural gas (Bio-LNG) fuel can be used to cool a superconducting motor. As illustrated in FIG. 3, an example cooling system 400 is shown. The system 400 work similar to that shown in FIG. 2. However, the Bio-LNG may be at a higher temperature than the $LH_2$. Thus, rather than using the Bio-LNG to directly cool the superconducting motor, the Bio-LNG is used to provide a cooling or working fluid to the cryocooler. Thus, the Bio-LNG is vaporized in the cryocooler and then recombined with a liquid Bio-LNG as described above.

As shown in FIG. 3, the system 400 includes Bio-LNG fuel tank 410. The Bio-LNG fuel in the Bio-LNG fuel tank 410 may be at a temperature of 112 K and a pressure of 1 bar.

A cryocooler 540 may be used to reduce the temperature of a cooling substance in a cooling loop 550 to 20K. In such a case, the Bio-LNG is used carry heat away from the cryocooler 540.

The fuel is moved from the Bio-LNG fuel tank 410 to a combustor 470 through various paths. The "main" fuel path is from the tank 410 to the combustor 470 through ejector 450 and then into the combustor 470. As detailed below, this main fuel path can include paths first and fourth paths 420 and 460.

The system 400 also includes a cooling path that provides fuel from the tank 410 to be used a cooling source provided to the cryocooler 540. The cooling path is shown as including the second fuel path 510 which branches from the main fuel path and provides liquid fuel to the cryocooler 540. The fuel is then partially or completely vaporized as is it passes through cryocooler 540. The partially or completely vaporized fuel is then provided via a third fuel path 520 back into the main fuel path. In particular, the third fuel path 520 provides the to a gas/vapor input 495 of the ejector 450. The partially or completely vaporized fuel is then mixed with the liquid fuel in the ejector 450 and mixed fuel is provided to combustor 470 via the fourth fuel path 460.

Additional optional elements are shown in the system 400 that can be used to control certain pressures/temperatures in the system so that it may operate more efficiently. These additional elements are not necessarily required.

In particular, the first path 420 may include the first pump 430, which moves the liquid fuel through the first path 420 by increasing the pressure of the liquid fuel. The first path 420 may include additional aircraft loads 440, which may be cooled through the flow of the liquid fuel.

To cool the motor 500, as noted above, the fuel further passes from the tank 410 through the second fuel path 510 and is provided through the cryocooler 540. A cryocooling loop 550 can be established through the cooling side 545 of the cryocooler 540.

The cryocooling loop 550 may optionally contain a second pump 530, which is used to increase the pressure of the cooling fluid in the cryocooling loop 550. The working/cooling fluid moves through the cryocooler 540 cooling the superconducting motor 500 and carriers heat away from the motor 500. The cryocooler 540 removes the heat from cooling fluid in the cryocooling loop 550. This results in the heat being transferred to the Bio-LNG fuel which may be vaporized. The cooling fluid can be any suitable working fluid such that can be cooled to a required superconducting temperature. An example is $LH_2$ and the $LH_2$ can be kept as about 20 K by the cryocooler 540 in one embodiment. Further, the working fluid may be chosen from the group consisting of helium, hydrogen, or a mixture of helium and hydrogen.

The vaporized fuel then exits the cryocooler 540 through third path 330, which transports the fuel to gas/vapor input 495 of the first two-phase ejector 450.

Once in the first two-phase ejector 450 the vaporized and liquid fuel are mixed, resulting in a liquid fuel at a pressure appropriate for the combustor 470. The fuel must be compressed to a compatible pressure in order to be used by the combustor. An appropriate pressure may be between 500 to 1000 psia. The two-phase ejector 450 is used to raise the pressure of the vaporized fuel to that of the combustor.

The liquid fuel that flows through the first path 420 is pressurized to a pressure higher than that required by the combustor 470, and acts as the primary flow to the two-phase ejector 450 and enters at liquid inlet 885 of the ejector 450. The flow of liquid fuel that flows through the first path 420 is accelerated through a converging-diverging nozzle to supersonic velocities and entrains the low-pressure vapor stream received via third path 520. The combined flows of liquid fuel through the first path 420 and vaporized fuel through third path 520 mix in a first mixing section 481 followed by a first diverging diffuser 490, which further recovers the appropriate pressure.

The pressurized fuel is then transported from the two-phase ejector 450 to the combustor 470 through fourth path 460. The resulting fuel is received by the first combustor 470, which generates rotational energy through the combustion of the liquid fuel, ultimately providing electricity to the first superconducting motor 500 as indicated by connection 480. The combustor 470 could be part of an engine and could also generate thrust.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for cooling a superconducting motor, the system comprising:
   a fuel tank that contains a fuel and includes a fuel output;
   a combustor that receives the fuel from the fuel tank and generates electric power due to combustion of the fuel and provides the electric power to the superconducting motor; and
   a cooling system that provides the fuel to the superconducting motor to cool the superconducting motor, the cooling system comprising:
      a two-phase ejector that includes a liquid fuel input fluidly coupled to the fuel tank, a vaporized fuel input fluidly coupled to the superconducting motor and an output fluidly coupled to the combustor;
      a main path that transports fuel from the fuel tank, through the two-phase ejector and to the combustor, wherein the liquid fuel input receives the liquid fuel from the fuel tank via the main path;
      a cooling path that that transports fuel from the fuel tank, through the superconducting motor and to the vaporized fuel input of the two-phase ejector, wherein the cooling path branches from the main fuel path;
      wherein the two-phase ejector mixes the fuel and the vaporized fuel together to form a fuel stream at the output that is provided to the combustor;
      wherein the liquid fuel is provided from the tank to the main and cooling paths in parallel;
      wherein the main path passes through other aircraft loads before the main path provides the liquid fuel to the liquid fuel input of the two-phase ejector.

2. The system of claim 1, wherein the fuel is $LH_2$.

3. The system of claim 1, wherein:
   the main path includes a first path that transports the liquid fuel from the tank to the liquid fuel input;
   the cooling path includes second path that carries liquid fuel from the tank to the superconducting motor;
   the cooling path includes a third path that that transports at least partially vaporized fuel away from the superconducting motor to the partially or totally vaporized fuel input; and the main path includes a fourth path that carriers mixed fuel from the output of the two-phase ejector to the combustor.

4. The system of claim 3, further comprising:
   a first pump arranged along the first path that increases the pressure of the fuel before it is provided to the two-phase ejector.

5. The system of claim 4, wherein the second path contains a second pump, that increases the pressure of the fuel before it is provided to the superconducting motor.

6. A method for cooling a superconducting motor, the system comprising:
   passing fuel from a fuel tank to a combustor to generates electric power due to combustion of the fuel;
   providing the electric power to the superconducting motor;
   wherein passing fuel includes:
      providing liquid fuel to a fuel a two-phase ejector that includes a liquid fuel input, a partially or totally vaporized fuel input and an output, wherein the liquid fuel is provided to the liquid fuel input via a main path;
      providing liquid fuel to a cooling path that that transports fuel from the fuel tank, through the superconducting motor and to the partially or totally vaporized fuel input of the two-phase ejector, wherein the fuel is partially or totally vaporized by the superconducting motor, wherein the cooling path branches from the main fuel path; and
      passing the liquid fuel from the main path to other aircraft loads before providing the liquid fuel to the liquid fuel input of the two-phase ejector;
      wherein the two-phase ejector mixes the fuel and the at least partially vaporized fuel together to form a fuel stream at the output; wherein the fuel is provided to the liquid fuel input and the cooling path in parallel.

7. The method of claim 6, wherein the fuel is $LH_2$.

8. The method of claim 7, wherein:
   the main path includes a first path that transports the liquid fuel from the tank to liquid fuel input;
   the cooling path includes second path that carrier liquid fuel from the tank to the superconducting motor;
   the cooling path includes a third path that that transports at least partially vaporized fuel away from the superconducting motor to the partially or totally vaporized fuel input; and
   the main path includes a fourth path that carriers mixed fuel from the output of the two-phase ejector to the combustor.

9. The method of claim 6, wherein the fuel is Bio-LNG.

10. The method of claim 9, wherein:
    the main path includes a first path that transports the liquid fuel from the tank to liquid fuel input;
    the cooling path includes second path that carries liquid fuel from the tank to the cryocooler;

the cooling path includes a third path that that transports at least partially vaporized fuel away from the cryo-cooler to the partially or totally vaporized fuel input; and the main path includes a fourth path that carriers mixed fuel from the output of the two-phase ejector to the combustor.

* * * * *